(12) United States Patent
Fan

(10) Patent No.: US 10,598,199 B1
(45) Date of Patent: Mar. 24, 2020

(54) CLAMPING APPARATUS

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 0 days.

(21) Appl. No.: 16/254,025

(22) Filed: Jan. 22, 2019

(51) Int. Cl.
| | |
|---|---|
| *F16B 2/12* | (2006.01) |
| *F16M 13/02* | (2006.01) |
| *B60R 11/02* | (2006.01) |
| *A47G 29/08* | (2006.01) |
| *B60R 11/00* | (2006.01) |

(52) U.S. Cl.
CPC ............... *F16B 2/12* (2013.01); *A47G 29/08* (2013.01); *B60R 11/0211* (2013.01); *B60R 11/0241* (2013.01); *B60R 11/0258* (2013.01); *F16M 13/022* (2013.01); *B60R 2011/0059* (2013.01); *B60R 2011/0071* (2013.01)

(58) Field of Classification Search
CPC ....... B60R 2011/0071; B60R 2011/075; B60R 11/0241; B60R 11/0258
See application file for complete search history.

(56) References Cited

U.S. PATENT DOCUMENTS

| | | | | |
|---|---|---|---|---|
| 5,463,688 | A * | 10/1995 | Wijas ................. | B60R 11/0241 379/446 |
| 5,836,563 | A * | 11/1998 | Hsin-Yung .......... | B60R 11/0241 248/316.4 |
| 7,080,812 | B2 * | 7/2006 | Wadsworth ............ | B60R 11/02 248/316.1 |
| 7,272,984 | B2 * | 9/2007 | Fan ........................ | B60R 11/02 248/231.61 |
| 7,537,190 | B2 * | 5/2009 | Fan ........................ | B60R 11/02 248/309.1 |
| 9,586,530 | B2 * | 3/2017 | Kim ........................ | B60R 11/02 |
| 9,749,002 | B1 * | 8/2017 | Fan ...................... | H04B 1/3888 |
| 9,975,497 | B2 * | 5/2018 | Kim .................... | B60R 11/0241 |
| 10,118,565 | B2 * | 11/2018 | Kim ...................... | B60R 11/02 |
| 10,259,400 | B1 * | 4/2019 | Song .................. | B60R 11/0241 |
| 2006/0278788 | A1 * | 12/2006 | Fan ........................ | B60R 11/02 248/309.1 |
| 2018/0252358 | A1 * | 9/2018 | Yang ...................... | F16M 13/00 |
| 2019/0052740 | A1 * | 2/2019 | Ormsbee ................ | B60R 11/02 |

\* cited by examiner

*Primary Examiner* — Bradley Duckworth
(74) *Attorney, Agent, or Firm* — Rabin & Berdo, P.C.

(57) ABSTRACT

A clamping apparatus includes a housing, two clamping arms, at least one manual actuator and a push member. The housing has a receiving area provided with a recessed region. The two clamping arms are assembled with the housing at two sides thereof, and are movably linked to each other via a main pinion disposed inside the housing. The push member is disposed in the recessed region and protrudes partially from the receiving area. When the push member is pressed toward an interior of the recessed region, the initial locking state is released so that the two clamping arms can move for clamping a mobile device. The manual actuator is assembled with the housing at a side thereof, and extends partially into the housing to mesh with the main pinion. A user can operate the manual actuator to concurrently drive the two clamping arms to open via the main pinion.

9 Claims, 8 Drawing Sheets

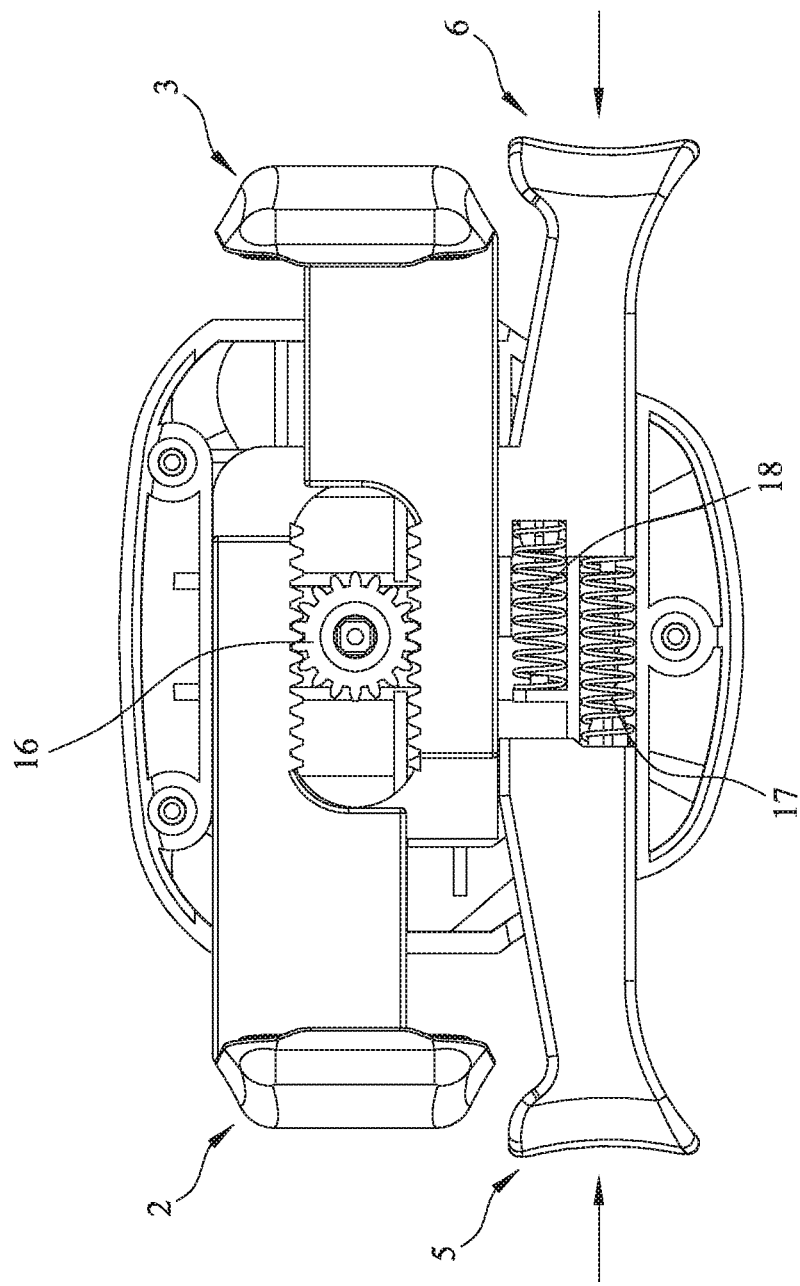

CLAMPING APPARATUS

BACKGROUND OF THE INVENTION

1. Field of the Invention

The present invention relates to clamping apparatuses, and more particularly to a clamping apparatus for a mobile device that is convenient in use.

2. The Prior Arts

Electronic mobile devices such as smartphones, satellite navigators, drive recorders and audio-video players can be typically used with a clamping apparatus, which allows a user to operate the mobile device in a vehicle or indoor without the need of holding the mobile device.

The inventor of the present application previously designed a clamping apparatus suitable for use with a portable electronic product, which includes a housing, two clamping units, a unidirectional limiting unit and a manual actuating unit. The housing has a receiving area adapted to receive the placement of a portable electronic product. The two clamping units are appended to two sides of the housing, and can slide transversally in a concurrent manner for opening or closing the clamping apparatus. The unidirectional limiting unit protrudes partially from the receiving area. When it is positioned in the receiving area, the portable electronic product can push the unidirectional limiting unit toward the interior of the housing, which releases an initial locking state and allows the two clamping units to slide concurrently toward a center and clamp the portable electronic product. When the manual actuating unit is depressed, the clamping units move gradually outward to open the clamping apparatus for removal or placement of the portable electronic product. However, the unidirectional limiting unit of the aforementioned structure is small in size, and may not be easily actuated for releasing the locking state after placement of a portable electronic product. Moreover, the manual actuating unit uses a mechanism involving multiple set of gears for driving the gradual movement of the clamping units. Unfortunately, the aforementioned approach results in an excessively complex structure inside the housing and requires a higher manufacture cost. This may not meet a current need for a lightweight, thin and compact device. The present inventor provides an improved design that can address the aforementioned issues.

SUMMARY OF THE INVENTION

An objective of the present invention is to provide a clamping apparatus that is convenient to operate, simple in structure, and has a low manufacture cost.

In order to achieve the foregoing objectives, the present invention includes a housing, two clamping arms, at least one manual actuator and a push member. An interior of the housing includes a main pinion, the housing externally having a receiving area provided with a recessed region, and the receiving area being adapted to receive the placement of a mobile device. The two clamping arms are assembled with the housing at two sides of the housing, the two clamping arms extending partially into the housing and being meshed with the main pinion, whereby the two clamping arms are movable in unison in opposite directions for opening or closing the clamping apparatus. The at least one manual actuator is assembled with the housing at a side thereof, the at least one manual actuator extending partially into the housing and being meshed with the main pinion, the interior of the housing further including at least one spring connected to the at least one manual actuator, wherein when the at least one manual actuator is pushed by a user toward the interior of the housing, the at least one manual actuator drives the main pinion in rotation and thereby causes the two clamping arms to open. The push member is disposed in the recessed region and protrudes partially from the receiving area, wherein when a mobile device is placed in the receiving area, the push member is pushed toward the recessed region to release a locking state, and the at least one spring urges the at least one manual actuator in movement so that the at least one manual actuator drives the two clamping arms to move via the main pinion for clamping the mobile device.

According to an embodiment, each of the two clamping arms includes a sliding plate portion and a clamping plate portion that form an L-like shape, a side of the sliding plate portion forming a rack. The two clamping plate portions project at two sides of the housing, the two sliding plate portions being disposed inside the housing in different directions, and the main pinion being meshed with the two racks, whereby the two clamping arms can move in unison in opposite directions for opening and closing.

According to an embodiment, the at least one manual actuator include a first manual actuator and a second manual actuator, the first manual actuator and the second manual actuator being disposed at two sides of the housing and partially extending into the housing. The at least one spring include a first spring and a second spring, the first spring being connected to the first manual actuator inside the housing, and the second spring being connected to the second manual actuator inside the housing. A user can press the first and second manual actuators with two fingers of one hand to effortlessly open the two clamping arms. When a subsequent locking state is released, the first and second springs can bias the first and second manual actuators to recover an initial position.

According to an embodiment, the first manual actuator includes a first urging part and a first coupling part connected to each other, the first urging part extending from outside the housing to the interior thereof and being connected to the first coupling part which is disposed inside the housing, the first coupling part having a side provided a first rack, the first rack being meshed with the main pinion, and the first spring being connected to the first urging part inside the housing.

According to an embodiment, the second manual actuator includes a second urging part and a second coupling part connected to each other, the second urging part extending from outside the housing to the interior thereof and being connected to the second coupling part which is disposed inside the housing, a central region of the second coupling part including an elongate hole having a sidewall provided with a second rack, the second rack being meshed with the main pinion, and the second spring being connected to the second urging part inside the housing.

According to an embodiment, the push member cooperates with a biasing spring and has a locking part disposed inside the housing, the push member having a locking state where the push member restricts the manual actuator to be able to move only toward the interior of the housing.

According to an embodiment, the recessed region has a hole extending through an outer sidewall of the housing, the push member and the locking part being connected to each other, the push member being restricted to only move upward and downward in the recessed region, the locking part being restricted to move inside the housing, the biasing spring being restrictedly positioned between the push member and an inner sidewall of the recessed region and biasing the push member toward the locking state. The locking part includes a rod portion and a transversal plate connected to each other to form a T-like shape, the rod portion extending outward through the hole to connect to the push member, the rod portion further extending through a center of the main pinion, a surface of the transversal plate having at least one bevel tooth meshed with the at least one manual actuator, whereby the at least one manual actuator is restricted to be able to move only toward the interior of the housing in the locking state.

According to an embodiment, the at least one bevel tooth include a first bevel tooth and a second bevel tooth respectively having bevel sides inclined in two opposite directions that are respectively provided on two side surfaces of the transversal plate at two sides of the rod portion, and the at least one manual actuator include a first manual actuator and a second manual actuator, the first coupling part having a bottom provided with first ratchet teeth, the second coupling part having a bottom provided with second ratchet teeth, the first bevel tooth and the second bevel tooth being at different heights and respectively meshed with the first ratchet teeth and the second ratchet teeth.

According to an embodiment, a surface area of the recessed region is between ⅜ and ½ of the surface area covered by the receiving area, and a surface area of the push member is between ⅜ and ½ of the surface area of the recessed region.

The present invention has a simple structure including a single main pinion respectively meshed with the two clamping arms and the first and second manual actuators, which has a lower manufacture cost. Upon a pressing action applied by a user, the manual actuator moves toward the interior of the housing by a distance which directly controls the opening width of the two clamping arms, which provides convenient operation.

BRIEF DESCRIPTION OF THE DRAWINGS

FIG. 8 is a planar view showing the inner structure of the present invention in an opening state.

DETAILED DESCRIPTION OF THE PREFERRED EMBODIMENT

Figure 1:
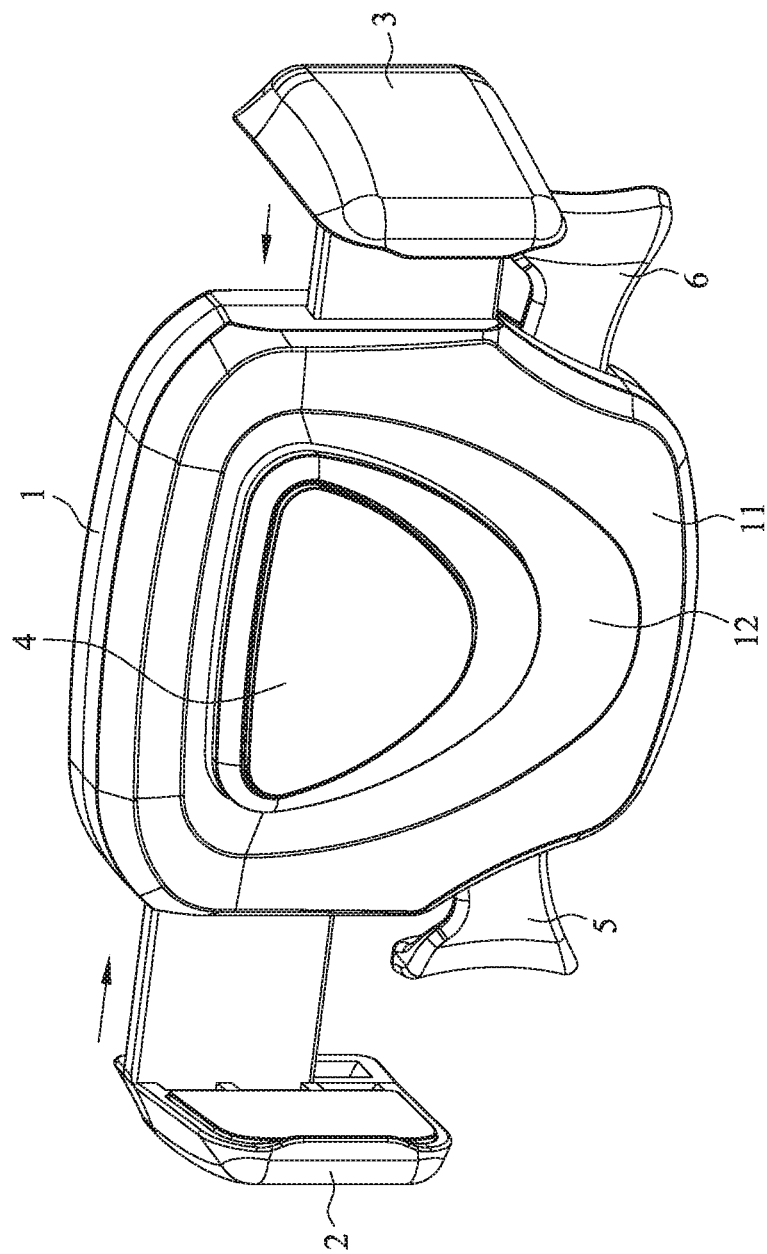
FIG. 1 is a perspective view showing an embodiment of a clamping apparatus according to the present invention.

FIG. 1 is a perspective showing an embodiment of the present invention. A clamping apparatus according to the present invention includes a housing 1, two clamping arms 2 and 3, a push member 4, and at least a manual actuator. In the illustrated embodiment, two manual actuators are provided, which include a first and a second manual actuators 5 and 6 respectively disposed at two sides of the housing 1. It will be appreciated, however, that a variant embodiment may provide only one manual actuator. The housing 1 externally has a receiving area 11 having a recessed region 12. The push member 4 is located in the recessed region 12, and is movable upward and downward within a short range of displacement. A locking state can be released when the push member 4 is depressed toward the interior of the recessed region 12, whereby allowing the two clamping arms 2 and 3 to move toward a central region and clamp a mobile device while the first and second manual actuators 5 and 6 concurrently move outward in parallel. When a user wants to open the clamping apparatus, the first and second manual actuators 5 and 6 are pushed to move toward the interior of the housing 1, which can control the opening distance of the two clamping arms 2 and 3.

Figure 2:
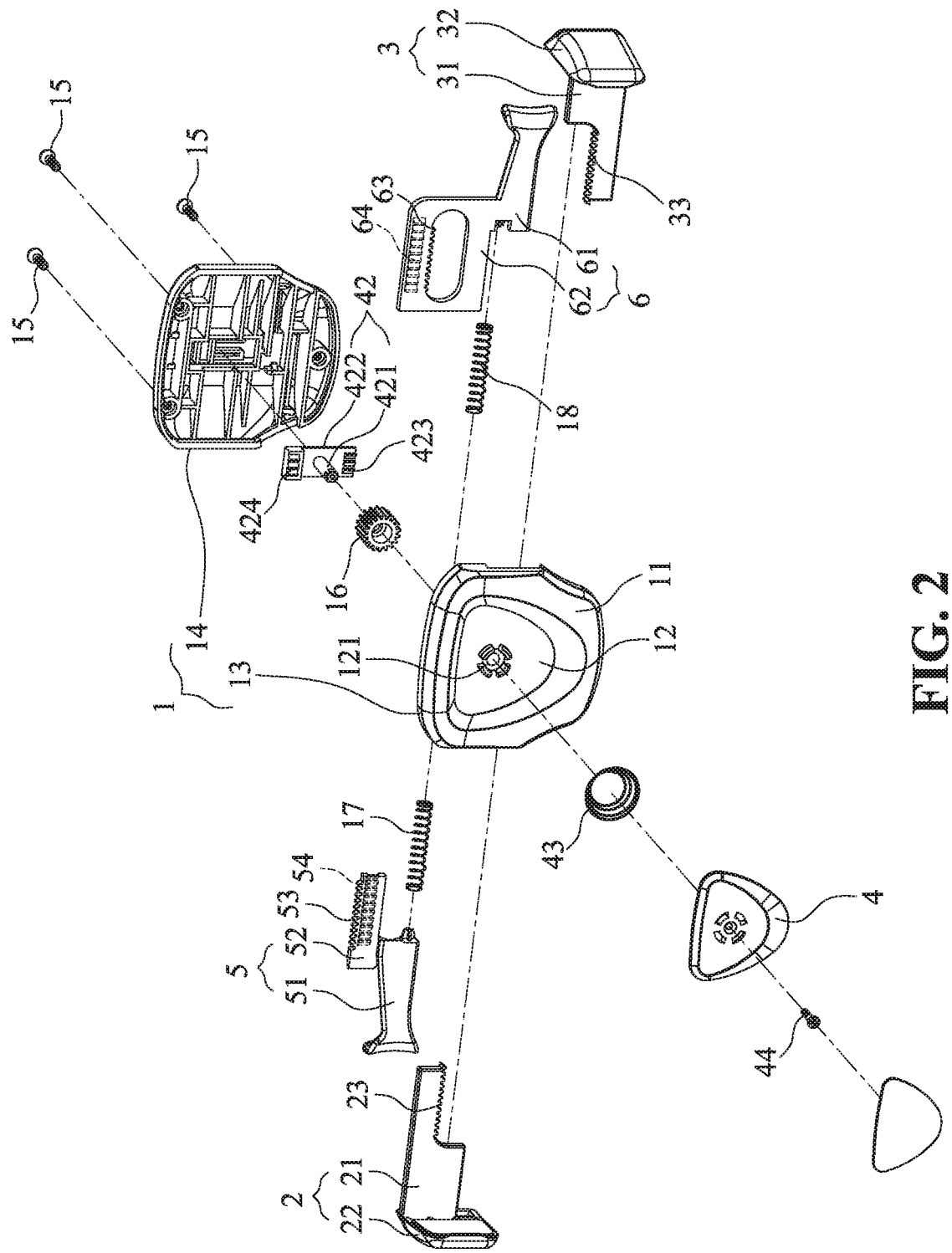
FIG. 2 is an exploded view of the present invention.

FIG. 2 is an exploded view showing further structure details of the present invention. Referring to FIG. 2, the housing 1 is formed by assembling an upper cover 13 and a bottom cover 14 which are fastened to each other with screws 15. The clamping arms 2 and 3, the first and second manual actuators 5 and 6 and the push member 4 are placed so as to be at least partially concealed inside the housing 1. A main pinion 16 is placed inside the housing 1, and is respectively meshed with the clamping arms 2 and 3 and the first and second manual actuators 5 and 6. The main pinion 16, the clamping arms 2 and 3 and the first and second manual actuators 5 and 6 are thereby movably linked to one another and can move in a concurrent manner. The upper cover 13 has a hole 121 placed in a central region of the recessed region 12.

Figure 3:
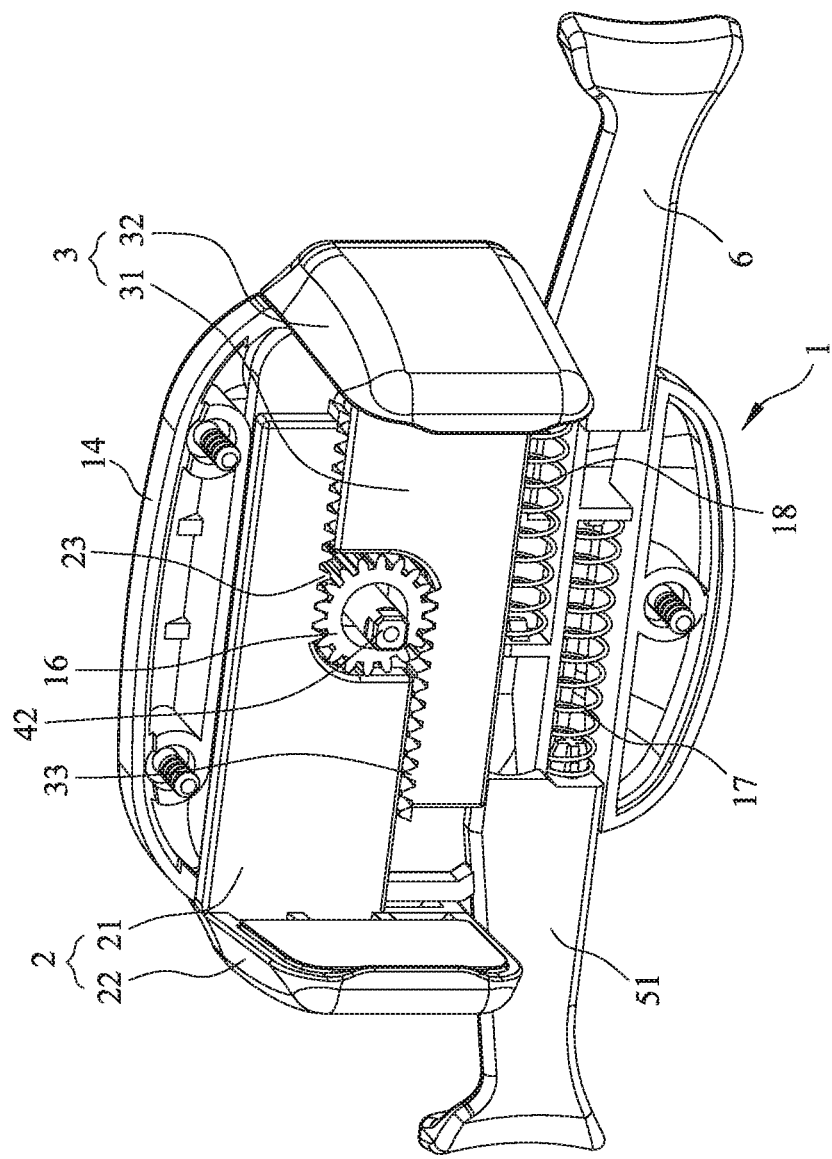
FIG. 3 is a schematic view showing an inner structure of the present invention after it is assembled without representing an upper cover.
Figure 4:
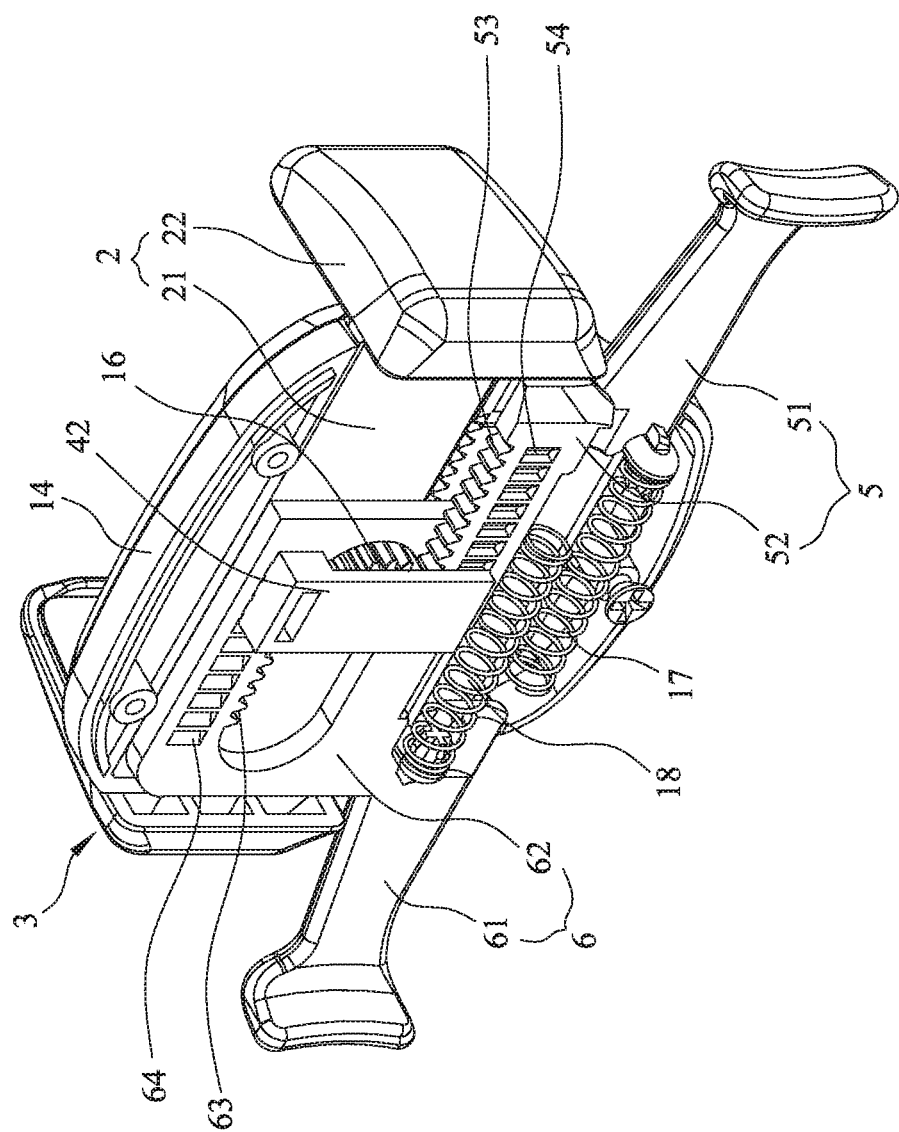
FIG. 4 is a schematic view showing an inner structure of the present invention after it is assembled without representing a bottom cover.
Figure 5:
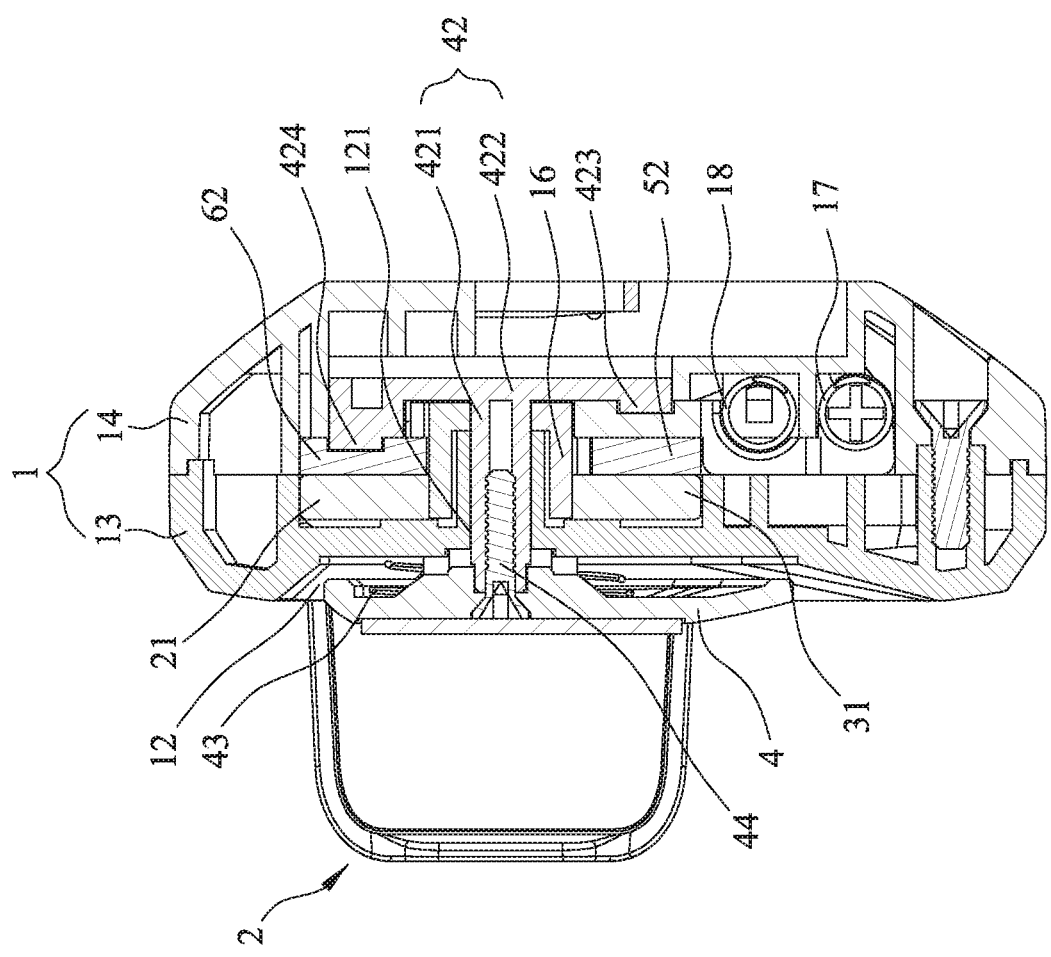
FIG. 5 is a longitudinal cross-sectional view of the present invention.

FIG. 3 is a schematic view showing an inner structure of the housing without representing the upper cover 13, FIG. 4 is a schematic view showing the inner structure of the housing without representing the bottom cover, and FIG. 5 is a cross-sectional view.

Each of the clamping arms 2 and 3 has an L-like shape, and is partially restricted within a cavity delimited by the upper cover 13 and the bottom cover 14 so that the clamping arms 2 and 3 can slide either toward a central region to effect clamping or in opposite directions away from each other for opening the clamping apparatus without completely separating from the housing 1. The clamping arm 2 includes a sliding plate portion 21 and a clamping plate portion 22 that form an L-like shape. A side of the sliding plate portion 21 forms a rack 23. The clamping arm 3 includes a sliding plate portion 31 and a clamping plate portion 32 that form an L-like shape. A side of the sliding plate portion 31 forms a rack 33. The main pinion 16 is placed between and is respectively meshed with the racks 23 and 33 so that the clamping arms 2 and 3 can move concurrently in opposite directions for opening or closing actions.

The first manual actuator 5 includes a first urging part 51 and a first coupling part 52 connected to each other. The first urging part 51 extends from outside the housing 1 to the interior thereof, and is connected to the first coupling part 52 which is disposed inside the housing 1. The first coupling part 52 has a side provided a first rack 53 and a bottom provided with first ratchet teeth 54, the first rack 53 being meshed with the main pinion 16. Moreover, the housing 1 includes a first spring 17 that is connected to the first urging part 51.

The second manual actuator 6 includes a second urging part 61 and a second coupling part 62 connected to each other. The second urging part 61 extends from outside the housing 1 to the interior thereof, and is connected to the second coupling part 62 which is disposed inside the housing 1. A central region of the second coupling part 62 includes an elongate hole having a sidewall provided with second rack 63, and a bottom of the second coupling part 62 includes second ratchet teeth 64, the second rack 63 being meshed with the main pinion 16. Moreover, the housing 1 includes a second spring 18 that is connected to the second urging part 61. After assembly, the first coupling part 52 and the second coupling part 62 are adjacent to each other and are located at different heights, as shown in FIG. 4. The main pinion 16 is placed between and is respectively meshed with the first rack 53 and the second rack 63.

After assembly, the first and second manual actuators 5 and 6 are located two sides of the housing 1, extend partially into the housing 1 and respectively mesh with the main pinion 16. The first and second manual actuators 5 and 6 can be pressed by a user to drive the two clamping arms 2 and 3 in movement via the main pinion 16 for controlling an opening width of the two clamping arms 2 and 3. The first and second manual actuators 5 and 6 need less effort to operate since they are pressed in different directions. However, opening of the two clamping arms 2 and 3 can also be controlled by providing one single manual actuator.

The push member 4 is a unidirectional locking unit. The locking state of the push member 4 restricts the first and second manual actuators 5 and 6 to be able to move only toward the interior of the housing 1, whereby the two clamping arms 2 and 3 can be locked in position once they are opened. The locking state can be released by depressing the push member 4 so that the push member 4 disengages from contact with the first and second manual actuators 5 and 6.

In the present embodiment, the push member 4 further has a locking part 42, and a biasing spring 43 is provided cooperating with the locking part 42. The push member 4 is affixed to the locking part 42 with a screw 44 so that push member 4 and the locking part 42 are movable in unison. The push member 4 is restricted to only move upward and downward in the recessed region 12, and the locking part 42 is restricted to move inside the housing 1. The biasing spring 43 is restrictedly positioned between the push member 4 and an inner sidewall of the recessed region 12, and can bias the push member 4 toward the locking state. The locking part 42 includes a rod portion 421 and a transversal plate 422 connected to each other to form a T-like shape. The rod portion 421 extends outward through the hole 121 to connect to the push member 4, and extends through a center of the main pinion 16. A surface of the transversal plate 422 has at least a bevel tooth. In the illustrated embodiment, a first bevel tooth 423 and a second bevel tooth 424 respectively having bevel sides inclined in two opposite directions are respectively provided on two side surfaces of the transversal plate 422 at two sides of the rod portion 421. The first bevel tooth 423 and the second bevel tooth 424 are at different heights, and are respectively meshed with the first ratchet teeth 54 and the second ratchet teeth 64 which are of different directions and locations (as shown in FIG. 4). The first and second manual actuators 5 and 6 can be thereby pushed to move toward the interior of the housing 1 and can be locked in position once the external pushing action is removed, like a ratchet mechanism.

In the present embodiment, a surface area of the recessed region 12 is between ⅜ and ½ of the surface area covered by the receiving area 11, and the surface area of the push member 4 is between ⅜ and ½ of the surface area of the recessed region 12. A mobile device can be thereby clamped more easily, and the push member 4 can be pushed effortlessly.

Operation of the present invention is described hereinafter. As shown in FIG. 1, the clamping arms 2 and 3 are in a largest opening state in an initial use state, which corresponds to the first and second manual actuators 5 and 6 being mostly pushed inside the housing 1.

Figure 6:
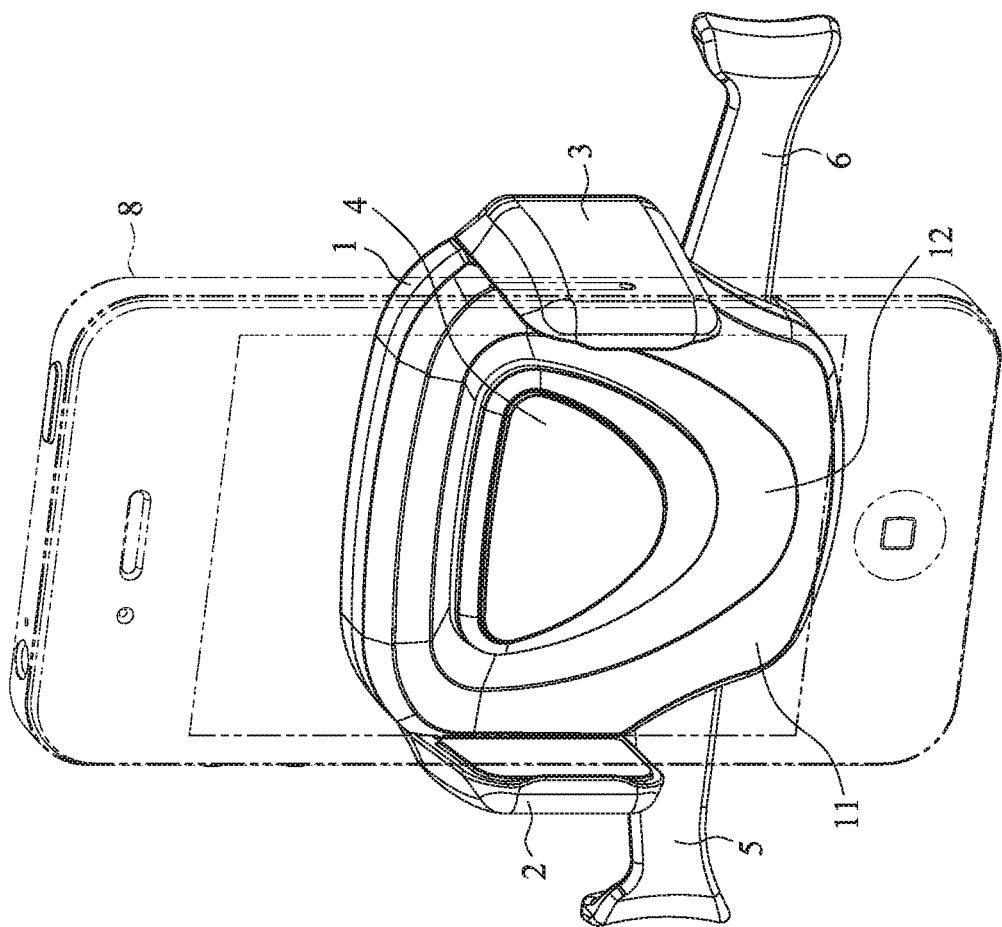
FIG. 6 is a perspective view showing two clamping arms of the present invention clamping a smartphone.
Figure 7:
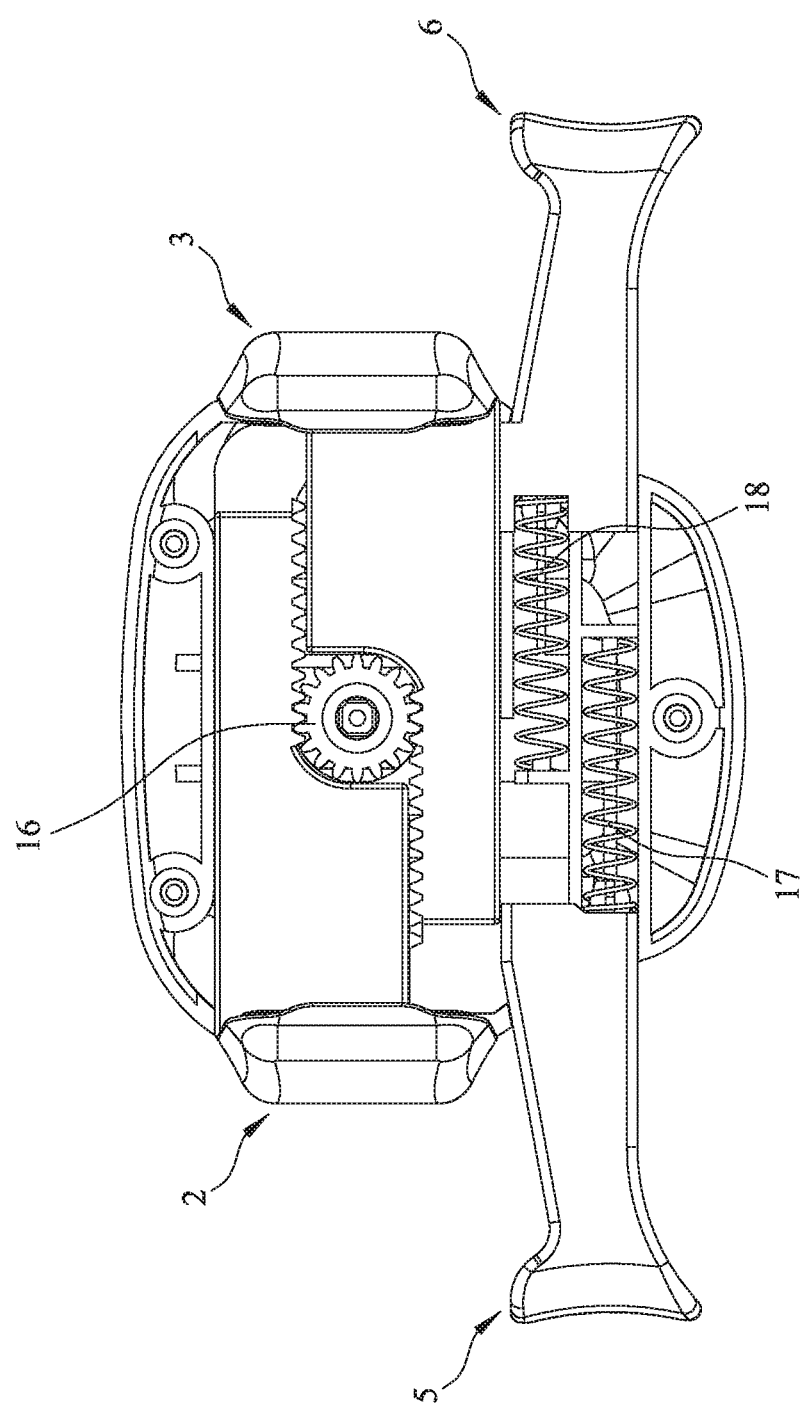
FIG. 7 is a planar view showing an inner structure of the present invention in a clamping state.

As shown in FIGS. 6 and 7, a smartphone 8 is positioned in the receiving area 11 and at the same time can press the push member 4 toward the interior of the recessed region 12. As a result, the locking part 42 moves in unison and disengages from the first ratchet teeth 54 and the second ratchet teeth 64, and the first and second springs 17 and 18 urge the first and second manual actuators 5 and 6 to move outward, which causes the main pinion 16 to rotate and consequently drive the clamping arms 2 and 3 to slide toward the center and clamp the smartphone 8 (shown with phantom lines in the figure).

As shown in FIG. 8, when the smartphone is to be removed, the first and second manual actuators 5 and 6 can be pressed respectively with a thumb and a little finger of one hand, which results in the main pinion 16 to rotate and consequently drive the clamping arms 2 and 3 to open. The pressure distance can be similar to the opening distance. As the two clamping arms 2 and 3 open, the clamping force exerted on the smartphone 8 is released and the biasing spring 43 urges the push member 4 to move outward, which can push against the smartphone 8 for facilitating its removal. The locking part 42 then engages with the first ratchet teeth 54 and the second ratchet teeth 64, which prevents the first and second manual actuators 5 and 6 from moving outward. In other words, the present invention can control the opening distance of the clamping arms 2 and 3. The travel of the first and second manual actuators 5 and 6 is equal to the opening width of the two clamping arms 2 and 3. If the first and second manual actuators 5 and 6 are displaced a smaller distance, the opening width would be relatively smaller. Therefore, the next time the smartphone 8 is positioned on the clamping apparatus, the clamping action can be achieved more quickly.

The present invention has a simple structure including the main pinion 16 respectively meshed with the two clamping arms 2 and 3 and the manual actuators, which has a lower manufacture cost. Upon a pressing action applied by a user, the manual actuator moves toward the interior of the housing by a distance which directly controls the opening width of the two clamping arms 2 and 3, which provides convenient operation. Moreover, the push member 4 has a large surface area, which facilitates its contact with a smartphone positioned in the receiving area for effortlessly releasing the locking state so as to achieve clamping of the smartphone.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A clamping apparatus comprising:
    a housing, an interior of the housing including a main pinion, the housing externally having a receiving area provided with a recessed region, the receiving area being adapted to receive the placement of a mobile device;
    two clamping arms assembled with the housing at two sides of the housing, the two clamping arms extending partially into the housing and being meshed with the main pinion, whereby the two clamping arms are movable in unison in opposite directions for opening or closing the clamping apparatus;

at least one manual actuator assembled with the housing at a side thereof, the at least one manual actuator extending partially into the housing and being meshed with the main pinion, the interior of the housing further including at least one spring connected to the at least one manual actuator, wherein when the at least one manual actuator is pushed by a user toward the interior of the housing, the at least one manual actuator drives the main pinion in rotation and thereby causes the two clamping arms to open; and a push member disposed in the recessed region and protruding partially from the receiving area, wherein when a mobile device is placed in the receiving area, the push member is pushed toward the recessed region to release a locking state in which the push member restricts the at least one manual actuator to be able to move only toward the interior of the housing, and the at least one spring urges the at least one manual actuator in movement so that the at least one manual actuator drives the two clamping arms to move via the main pinion for clamping the mobile device.

2. The clamping apparatus according to claim 1, wherein each of the two clamping arms includes a sliding plate portion and a clamping plate portion that form an L-like shape, a side of the sliding plate portion forming a rack, the two clamping plate portions projecting at two sides of the housing, the two sliding plate portions being disposed inside the housing in different directions, and the main pinion being meshed with the two racks.

3. The clamping apparatus according to claim 1, wherein the at least one manual actuator include a first manual actuator and a second manual actuator, the first manual actuator and the second manual actuator being disposed at two sides of the housing and partially extending into the housing, and the at least one spring include a first spring and a second spring, the first spring being connected to the first manual actuator inside the housing, and the second spring being connected to the second manual actuator inside the housing.

4. The clamping apparatus according to claim 3, wherein the first manual actuator includes a first urging part and a first coupling part connected to each other, the first urging part extending from outside the housing to the interior thereof and being connected to the first coupling part which is disposed inside the housing, the first coupling part having a side provided a first rack, the first rack being meshed with the main pinion, and the first spring being connected to the first urging part inside the housing.

5. The clamping apparatus according to claim 3, wherein the second manual actuator includes a second urging part and a second coupling part connected to each other, the second urging part extending from outside the housing to the interior thereof and being connected to the second coupling part which is disposed inside the housing, a central region of the second coupling part including an elongate hole having a sidewall provided with a second rack, the second rack being meshed with the main pinion, and the second spring being connected to the second urging part inside the housing.

6. The clamping apparatus according to claim 1, wherein the push member cooperates with a biasing spring and has a locking part disposed inside the housing, the push member having a locking state where the push member restricts the first and second manual actuators to be able to move only toward the interior of the housing.

7. The clamping apparatus according to claim 6, wherein the recessed region has a hole extending through an outer sidewall of the housing, the push member and the locking part being connected to each other, the push member being restricted to only move upward and downward in the recessed region, the locking part being restricted to move inside the housing, the biasing spring being restrictedly positioned between the push member and an inner sidewall of the recessed region and biasing the push member toward the locking state, the locking part including a rod portion and a transversal plate connected to each other to form a T-like shape, the rod portion extending outward through the hole to connect to the push member, the rod portion further extending through a center of the main pinion, a surface of the transversal plate having at least one bevel tooth meshed with the at least one manual actuator, whereby the at least one manual actuator is restricted to be able to move only toward the interior of the housing in the locking state.

8. The clamping apparatus according to claim 7, wherein the at least one bevel tooth include a first bevel tooth and a second bevel tooth respectively having bevel sides inclined in two opposite directions that are respectively provided on two side surfaces of the transversal plate at two sides of the rod portion, and the at least one manual actuator include a first manual actuator and a second manual actuator, a first coupling part having a bottom provided with first ratchet teeth, a second coupling part having a bottom provided with second ratchet teeth, the first bevel tooth being meshed with the first ratchet teeth, and the second bevel tooth being meshed with the second ratchet teeth.

9. The clamping apparatus according to claim 1, wherein a surface area of the recessed region is between ⅜ and ½ of the surface area covered by the receiving area, and a surface area of the push member is between ⅜ and ½ of the surface area of the recessed region.

* * * * *